United States Patent
Jin et al.

(10) Patent No.: US 8,238,871 B2
(45) Date of Patent: *Aug. 7, 2012

(54) METHODS AND APPARATUS FOR LIMITING COMMUNICATION CAPABILITIES IN MOBILE COMMUNICATION DEVICES

(75) Inventors: Xin Jin, Waterloo (CA); Muhammad Khaledul Islam, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,703

(22) Filed: Jun. 1, 2011

(65) Prior Publication Data

US 2011/0230163 A1  Sep. 22, 2011

Related U.S. Application Data

(63) Continuation of application No. 12/704,052, filed on Feb. 11, 2010, now Pat. No. 8,045,969, which is a continuation of application No. 11/683,283, filed on Mar. 7, 2007, now Pat. No. 7,689,256, which is a continuation of application No. 10/704,846, filed on Nov. 10, 2003, now Pat. No. 7,206,567.

(51) Int. Cl.
*H04M 11/04* (2006.01)

(52) U.S. Cl. ............... 455/404.1; 455/115.1; 455/127.1; 455/127.5; 455/343.1; 455/343.2; 455/343.3; 455/343.4; 455/343.5; 455/521; 455/572; 455/574

(58) Field of Classification Search ............... 455/115.1, 455/343.1, 343.5, 404.1, 417, 418, 550.1, 455/558, 572, 573, 574, 575.1, 127.1, 127.5, 455/343.2, 343.3, 343.4, 521

See application file for complete search history.

(56) References Cited

U.S. PATENT DOCUMENTS

| | | | | |
|---|---|---|---|---|
| 5,150,031 A * | 9/1992 | James et al. | ................... | 320/164 |
| 5,230,016 A * | 7/1993 | Yasuda | ........................ | 455/573 |
| 5,678,188 A * | 10/1997 | Hisamura | ..................... | 455/509 |
| 5,774,784 A * | 6/1998 | Ohno | ........................ | 455/343.2 |
| 5,924,044 A * | 7/1999 | Vannatta et al. | ........... | 455/556.1 |
| 6,087,949 A * | 7/2000 | Yanagida | ...................... | 340/635 |
| 6,427,072 B1 * | 7/2002 | Reichelt | ..................... | 455/404.1 |
| 6,504,484 B1 * | 1/2003 | Weng | ............................. | 340/584 |
| 6,574,209 B1 * | 6/2003 | Kosaka | ......................... | 370/342 |
| 7,206,567 B2 * | 4/2007 | Jin et al. | ...................... | 455/404.1 |
| 2004/0147277 A1 * | 7/2004 | Kaewell et al. | ............... | 455/522 |

* cited by examiner

*Primary Examiner* — Olumide T Ajibade Akonai
(74) *Attorney, Agent, or Firm* — John J. Oskorep, Esq.

(57) ABSTRACT

Techniques for use in a mobile device involve detecting a temperature condition at said device and, in response, operating in a limited communication state for which only emergency communication is permitted. When the mobile device receives a user-initiated communication request, the mobile device inhibits non-emergency communication but permits emergency communication despite the existence of said temperature condition.

28 Claims, 4 Drawing Sheets

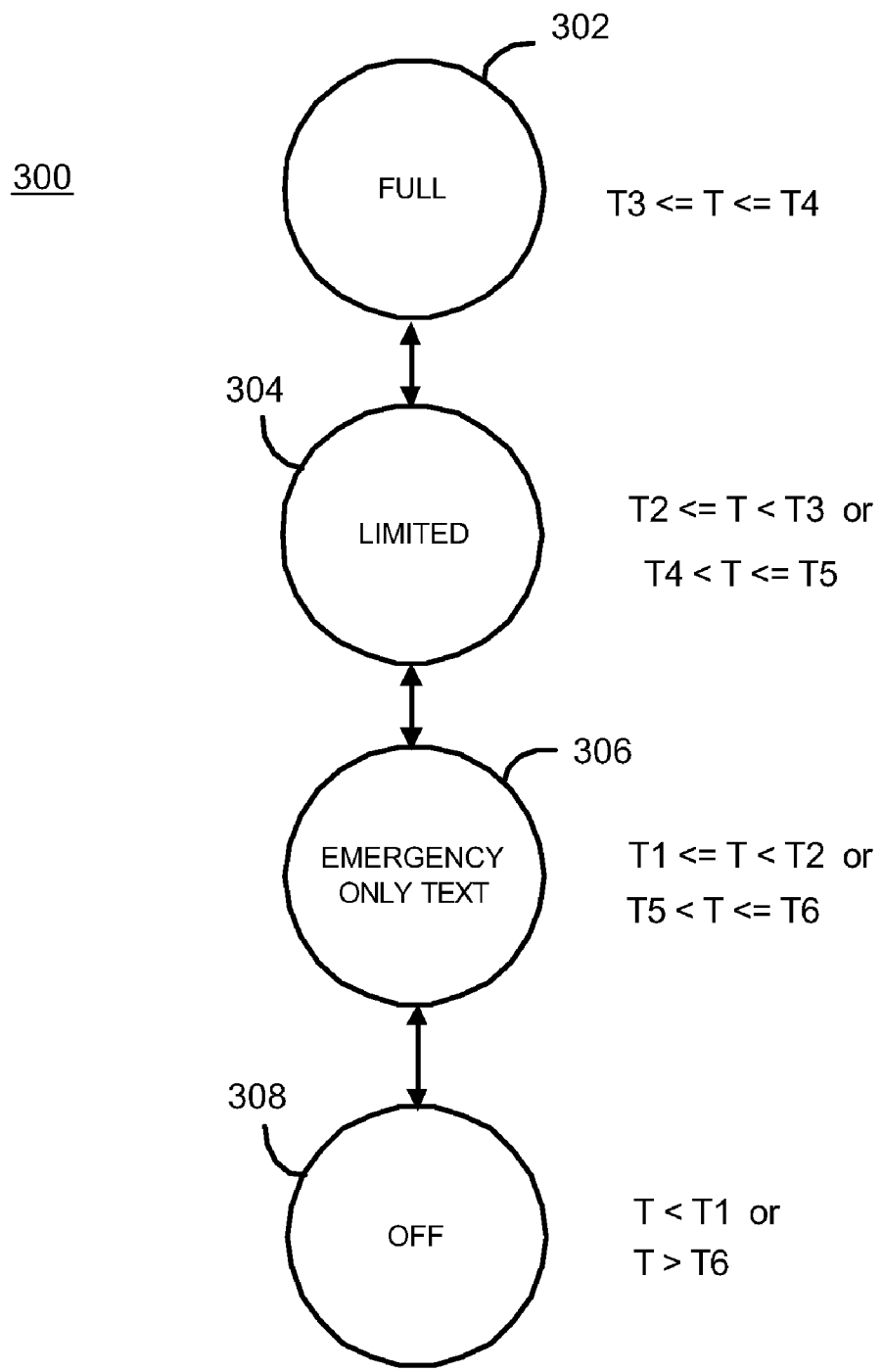

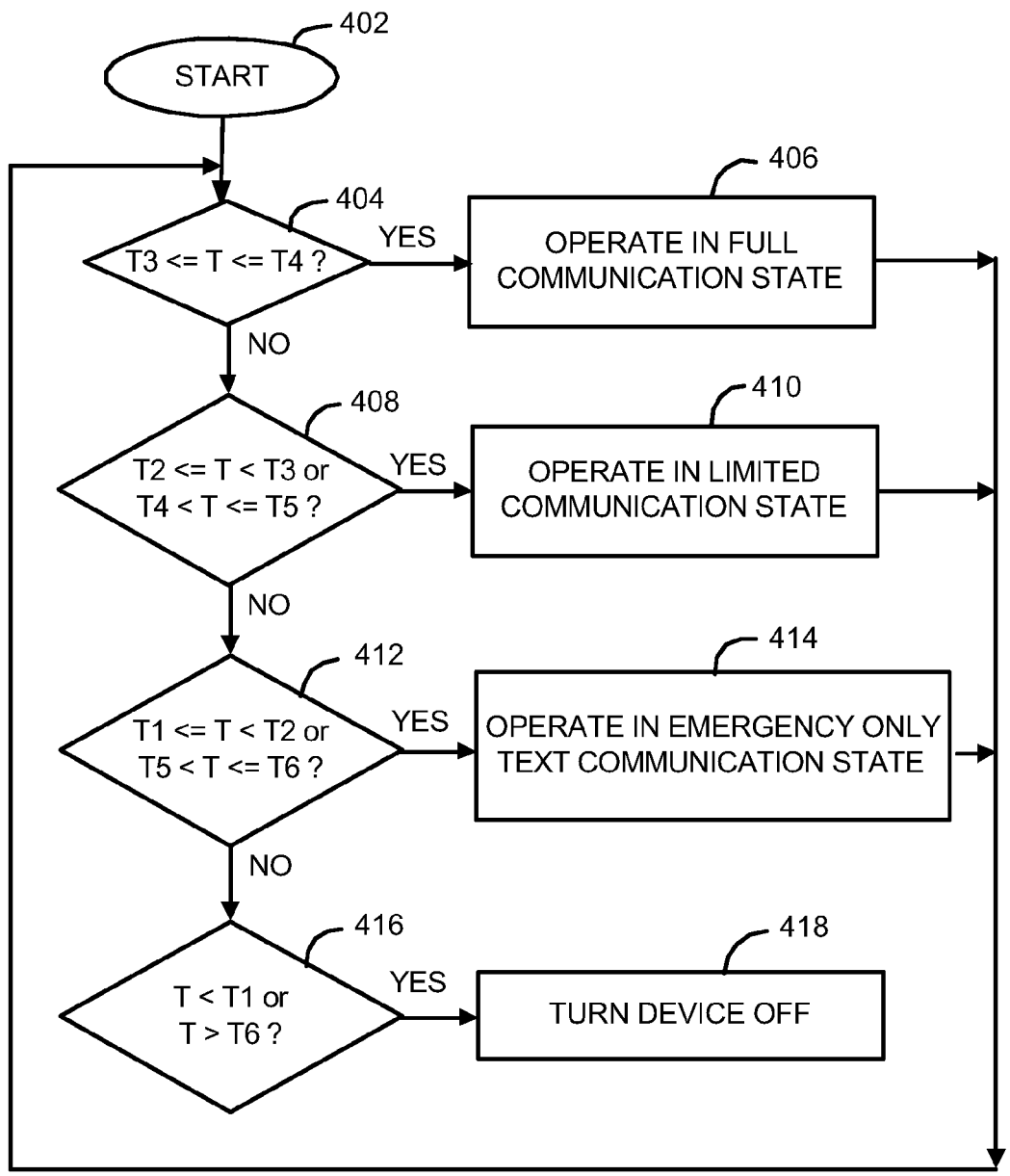

METHODS AND APPARATUS FOR LIMITING COMMUNICATION CAPABILITIES IN MOBILE COMMUNICATION DEVICES

CROSS-REFERENCE TO RELATED APPLICATIONS

The present application is a continuation of and dams priority to U.S. non-provisional patent application having application Ser. No. 12/704,052 and filing date of 11 Feb. 2010, now U.S. Pat. No. 8,045,969, which is a continuation of and claims priority to application having application Ser. No. 11/683,283 and filing date of 7 Mar. 2007, now U.S. Pat. No. 7,689,256, which is a continuation of and claims priority to application having application Ser. No. 10/704,846 and filing date of 10 Nov. 2003, now U.S. Pat. No. 7,206,567, each application being hereby incorporated by reference herein.

BACKGROUND

1. Field of the Invention

The present invention relates generally to mobile communication devices which operate in wireless communication networks, and more particularly to methods and apparatus for limiting communication capabilities at the mobile device based on predetermined conditions detected at the mobile device.

2. Description of the Related Art

Modern-day mobile communication devices which operate in wireless communication networks provide end users with the ability to place and receive two-way voice calls, send and receive text messages and e-mail messages, and send and receive other information such as Internet data. Such communication devices utilize a radio frequency (RF) transceiver for transmitting and receiving such information.

Unfortunately, adverse conditions (such as adverse temperature conditions) may compromise the performance or utility of the mobile device. For example, when a mobile device is communicating information with use of its RF transceiver, the RF transceiver heats up and its temperature rises. If the temperature of the RF transceiver is outside certain specification parameters, the RF transceiver undesirably emits spurious signals at unacceptable levels. These spurious signals may be outside certain standards, such as those established by the Federal Communications Commission (FCC) or Industry Canada, for example, and/or cause interference with other communications in the network. In addition, if the temperature of a rechargeable battery of the mobile device is outside certain specification parameters for too long, the battery may experience permanent damage and require replacement or could even explode.

Under such adverse conditions, the mobile station could power down its circuitry and inhibit all communications, but the end user would be left with no ability to communicate information. This would be undesirable in at least some circumstances, such as in emergency situations. What are needed are methods and apparatus which overcome the deficiencies of current practices.

BRIEF DESCRIPTION OF THE DRAWINGS

Embodiments of present invention will now be described by way of example with reference to attached figures, wherein:

FIG. 3 is a state diagram showing various communicating states of the mobile communication device of FIGS. 1 and 2; and FIG. 4 is a flowchart for describing a method of limiting communication capabilities in the mobile communication device of FIGS. 1 and 2.

DETAILED DESCRIPTION OF THE PREFERRED EMBODIMENTS

Figure 1:
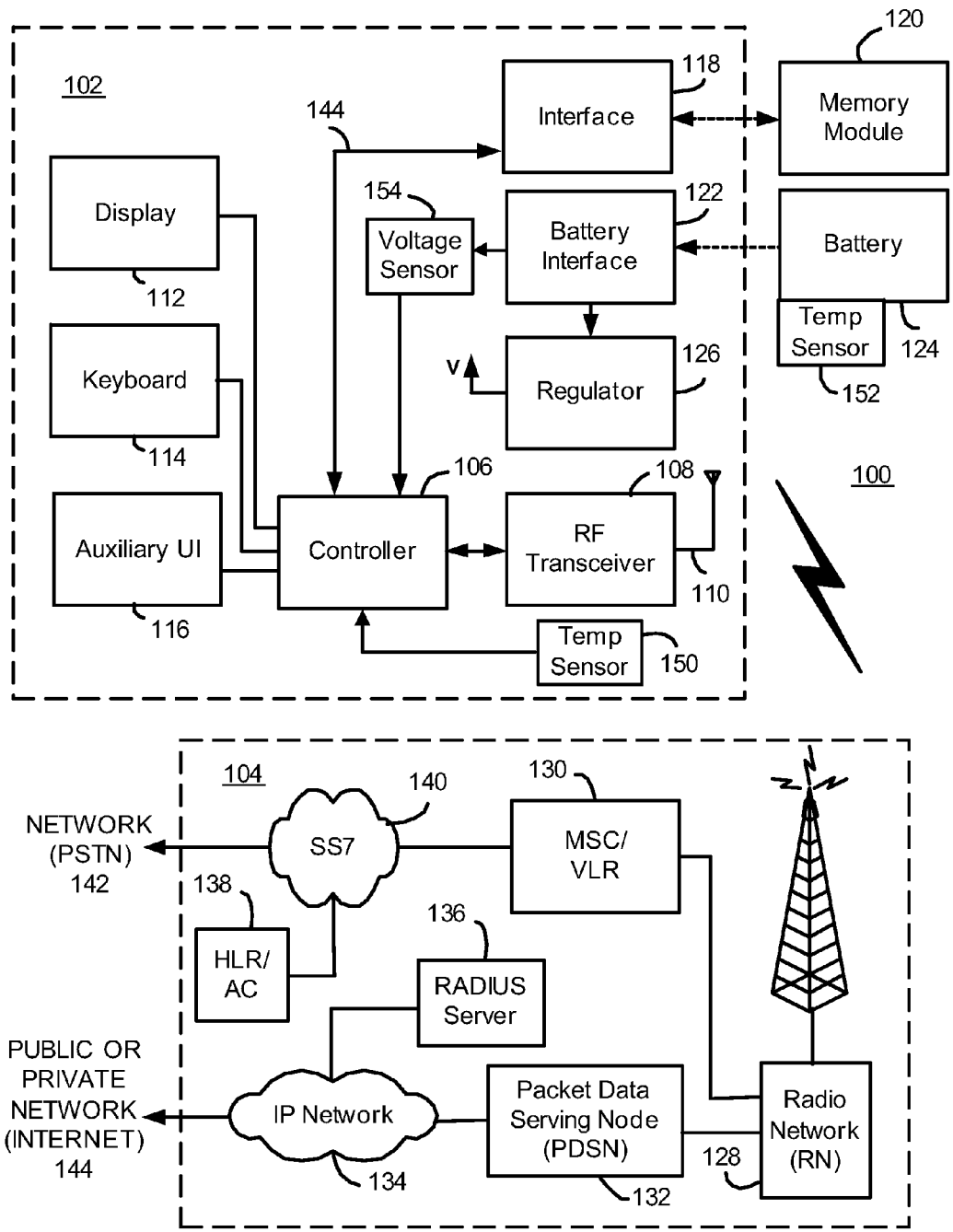
FIG. 1 is a block diagram which illustrates pertinent components of a mobile communication device which communicates within a wireless communication network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 includes a battery interface 122 for receiving one or more rechargeable batteries 124 or a battery pack. Battery 124 provides electrical power to electrical circuitry in mobile station 102, and battery interface 122 provides for a mechanical and electrical connection for battery 124. Battery interface 122 is coupled to a regulator 126 which regulates power to the device. Mobile station 102 also operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into a memory module within controller 106 which is a non-volatile memory.

Mobile station 102 also includes one or more temperature sensors and a battery voltage sensor 154 which are used to control its operational states and communication capabilities (described later in detail in relation to FIGS. 3-4). In the present embodiment, two temperature sensors are included in mobile station 102. One temperature sensor 150 is located adjacent RF transceiver 108 and, more specifically, adjacent to a power amplifier (PA) of RF transceiver 108. Temperature sensor 150 is coupled to controller 106 which continually monitors a temperature from temperature sensor 150. Temperature sensor 150 may be, for example, a thermistor having a resistance which varies in accordance with temperature changes which are detected as voltage changes at controller 106. When mobile station 102 is communicating information with use of RF transceiver 108 (e.g. with its transmitter on), for example, RF transceiver 108 heats up and its temperature rises. The ambient temperature also affects the operating temperature of RF transceiver 108. If the temperature of RF transceiver 108 is outside certain specification parameters, spurious signals would be undesirably emitted at unacceptable levels. However, mobile station 102 operates to eliminate or reduce the possibility of such occurrences as will be described later below in relation to FIGS. 3 and 4.

Note that, although only a single temperature sensor 150 is shown and described for RF transceiver 108, a temperature sensor may be utilized for each one of multiple PAs in mobile station 102 which correspond to multiple frequency bands within which the mobile station 102 may operate (e.g. cellular band, PCS band, etc.).

Another temperature sensor 152 may be located in battery or battery pack 124. Temperature sensor 152 is coupled to controller 106 through battery interface 122. Temperature sensor 152 may be, for example, a thermistor which fluctuates its resistance in accordance with changes in temperature to provide a change in voltage which is detected at controller 106. When mobile station 102 is communicating information with use of RF transceiver 108 (e.g. with its transmitter on), for example, battery 124 heats up and its temperature rises. The ambient temperature also affects the temperature of battery 124. If the temperature of battery 124 is outside certain specification parameters for too long of a time period, battery 124 may experience permanent damage and require replacement or could even explode. However, mobile station 102 operates to eliminate or reduce the possibility of such occurrences as will be described later below in relation to FIGS. 3 and 4.

Battery voltage sensor 154 is also coupled to controller 106 through battery interface 122. Battery voltage sensor 154 may be implemented using an analog-to-digital (A/D) converter, for example. Battery voltage sensor 154 is used to continually measure the voltage of battery 256, so that controller 106 may appropriately control RF transceiver 108. In particular, when the battery voltage becomes low, mobile station 102 operates to limit the use of RF transceiver 108 to extend the life of battery 124 as will be described later below.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a cdma2000™ network which includes fixed network components coupled as shown in FIG. 1. Coma2000™ is a trademark of the Telecommunications Industry Association (TIA). Wireless network 104 of the cdma2000™ type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a cdma2000™ based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link. We use a cdma2000™ network as an example for the description, but these techniques in the present application are not limited to the use of cdma2000™.

Figure 2:
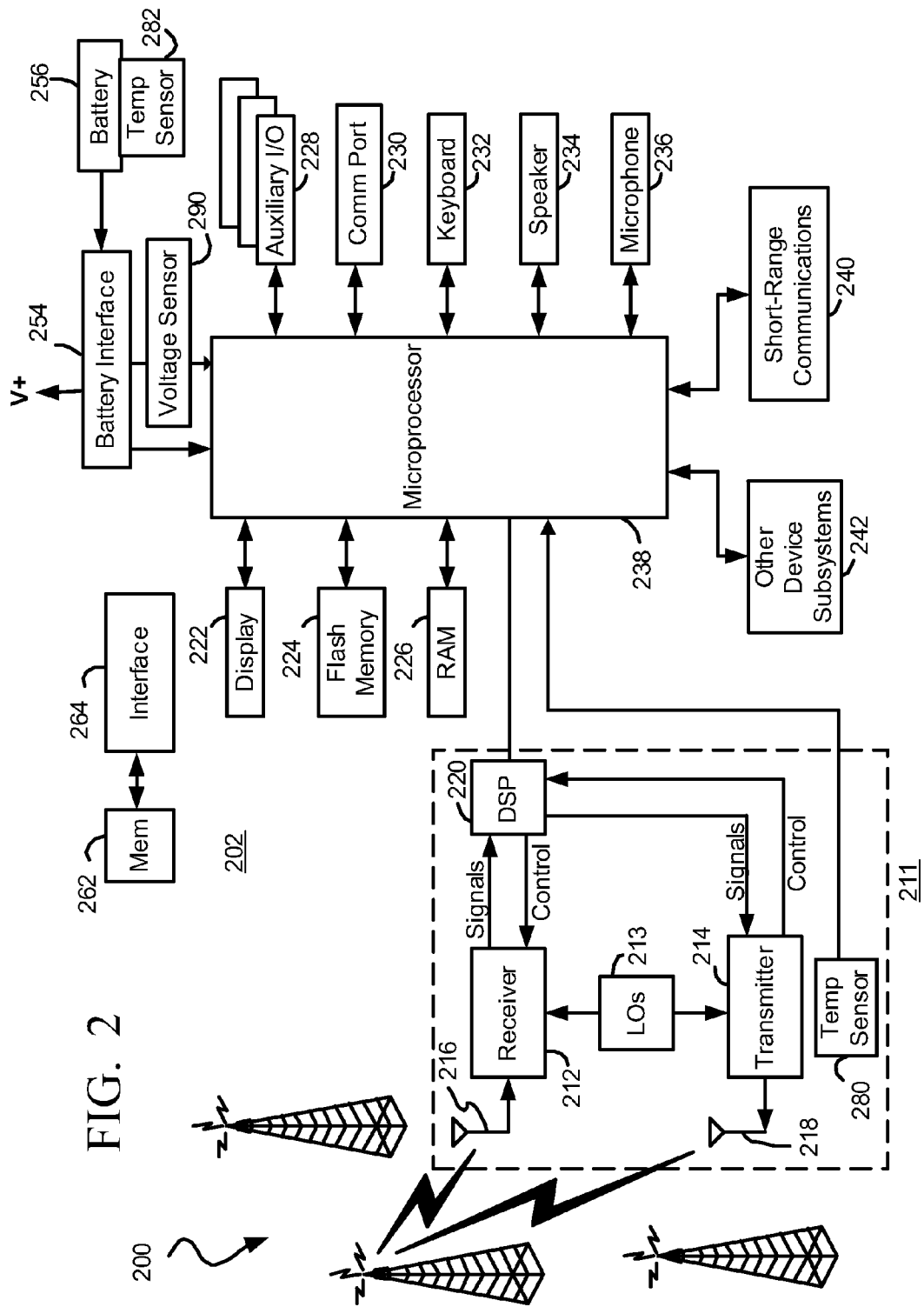
FIG. 2 is a more detailed diagram of a preferred mobile communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, flash memory 224 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, an external communication port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, communication port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Communication port 230 in FIG. 2 is normally implemented in a personal digital assistant (PDA)-type communication device for which synchronization with a user's desktop or laptop computer is a desirable, albeit optional, component. Examples of such a port include an RS-232 port and a Universal Serial Bus (USB). Communication port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an IrDA™ communication module or a Bluetooth™ communication module to provide for communication with similarly-enabled systems and devices. IrDA™ and Bluetooth™ are trademarks of Infrared Data Association and Bluetooth SIG Inc., respectively. A PDA-type communication device may also use IrDA or Bluetooth technology for synchronization with a user's desktop or laptop computer.

Mobile station 202 also includes one or more temperature sensors and a battery voltage sensor 290 which are used to control its operational states and communication capabilities (described later in detail in relation to FIGS. 3-4). In the present embodiment, two temperature sensors are included in mobile station 202. One temperature sensor 280 is located adjacent communication subsystem 211 and, more specifically, adjacent to a power amplifier (PA) of communication subsystem 211, for example. Temperature sensor 280 is coupled to microprocessor 238, which continually monitors a temperature from temperature sensor 280. Temperature sensor 280 may be, for example, a thermistor having a resistance which varies in accordance with changes in temperature to provide a change in voltage detected at microprocessor 238. When mobile station 202 is communicating information with use of communication subsystem 211 (e.g. with its transmitter 214 on), for example, communication subsystem 211 heats up and its temperature rises. The ambient temperature also affects the temperature of components in communication subsystem 211. If the temperature of communication subsystem 211 is outside certain specification parameters, spurious signals would be undesirably emitted by transmitter 214 at unacceptable levels. However, mobile station 202 operates to eliminate or reduce the possibility of such occurrences as will be described later below in relation to FIGS. 3 and 4.

Note that, although only a single temperature sensor 280 is shown and described for communication subsystem 211, a temperature sensor may be utilized for each one of multiple PAs in mobile station 202 which correspond to multiple frequency bands within which the mobile station 202 may operate (e.g. cellular band, PCS band, etc.).

Another temperature sensor 282 is located in battery or battery pack 256. Temperature sensor 282 is coupled to microprocessor 238 through battery interface 254. Temperature sensor 282 may be, for example, a thermistor which fluctuates its resistance in accordance with changes in temperature to provide a change in voltage detected at microprocessor 238. When mobile station 202 is communicating information with use of communication subsystem 211 (e.g. with its transmitter 214 on), for example, battery 256 heats up and its temperature rises. The ambient temperature also affects the temperature of battery 256. If the temperature of battery 256 is outside certain specification parameters for too long of a time period, battery 256 may experience permanent damage and require replacement or could even explode. However, mobile station 202 operates to eliminate or reduce the possibility of such occurrences as will be described later below in relation to FIGS. 3 and 4.

Battery voltage sensor 290 is also coupled to microprocessor 238 through battery interface 254. Battery voltage sensor 290 may be implemented using an analog-to-digital (A/D) converter, for example. Battery voltage sensor 290 is used to continually measure the voltage of battery 256, so that microprocessor 238 may appropriately control communication subsystem 211. In particular, when the battery voltage becomes low, mobile station 202 operates to limit the use of communication subsystem 211 to extend the life of battery 256 as will be described later below.

FIG. 3 is a state diagram 300 which illustrates various operating states of a mobile communication device such as the mobile station shown and described in relation to FIGS. 1 and 2. More particularly, state diagram 300 illustrates various communication states which are responsive to different operating conditions of the mobile station. In the present embodiment of FIG. 3, the different communication states of the mobile station are responsive to different temperature conditions of the mobile station. The changes in communication states, however, could be responsive to other changing operating conditions of the mobile station, such as low battery conditions or automatic location-based power down conditions (e.g. automatic airplane power down).

As shown in state diagram 300, the communication states of the mobile station include a full communication state 302, a limited communication state 304, an emergency-only text communication state 306, and an off state 308. In general, the mobile station continually monitors a reading from a sensor and selects one of the communication states 302, 304, 306, and 308 based on the reading. In particular in FIG. 3, the mobile station monitors an operating temperature T based on a reading from a temperature sensor and selects one of the communication states 302, 304, 306, and 308 based on temperature. Several predetermined temperature thresholds are known by and stored in memory of the mobile station. In this exemplary embodiment, six (6) different temperature thresholds T1, T2, T3, T4, T5, and T6 are known by and stored in the mobile station, where T1<T2<T3<T4<T5<T6. These six different temperature thresholds are associated with different operating temperature ranges which may include a normal operating temperature range T3-T4; one or more poor operating temperature ranges T2-T3 and T4-T5 (lower and upper, respectively); one or more very poor operating temperature ranges T1-T2 and T5-T6 (lower and upper, respectively); and one or more extremely poor operating temperature ranges less than T1 or greater than T6.

Preferably, the mobile station selects one of the communication states 302, 304, 306, and 308 based on readings from more than one sensor. For example, the mobile station may select one of the communication states based on both the temperature of the RF PA and the temperature of the battery. As another example, the mobile station may select one of the communication states based on both the temperature of the RF PA and the battery voltage of the battery. Using this type of approach, each sensor has a corresponding set of predetermined thresholds which are stored in memory of the mobile station. Accordingly, a communication state of the mobile station is determined and selected based on readings and decisions from all of relevant sensors. For example, the mobile station may select the most limiting communication state associated with any one of the sensors as the current communication state.

For clarity, state diagram 300 of FIG. 3 will be described where a single operating temperature (which may be viewed as a composite reading from all sensors) drives the selection of a communication state. Under normal operating circumstances, the mobile station identifies the operating temperature T to be within a predetermined temperature range of T3≦T≦T4. T3 may be about −10° C. and T4 may be about 60° C., for example. In this case, the mobile station will operate in full communication state 302. In full communication state 302, the mobile station allows its full communication capabilities for the end user. The mobile station permits two-way voice calls and data packet communication sessions (e.g. e-mail message and Internet data communications). The wireless transceiver of the mobile station is kept operational, although the transmitter and receiver may be powered down intermittently in sleep modes when necessary to conserve power as is conventional. The coding and modulation methods utilized by the wireless transceiver are not limited in any way in state 302. Preferably, a visual indication of this communication state is provided in the visual display of the mobile station (e.g. "FULL").

In poor temperature conditions, the mobile station identifies the operating temperature T to be within one of the poor operating temperature ranges, where T2≦T<T3 or T4<T≦T5. T2 may be about −20° C. and T5 may be about 80° C., for example. If the operating temperature T is poor, spurious signals may be undesirably emitted by the transmitter at unacceptable levels when transmitting at the allowed maximum transmit power level in normal operating circumstances. Also, the battery may experience permanent damage and require replacement. Thus, if T2≦T<T3 or T4<T≦T5, the mobile station controls itself to operate in limited communication state 304. In limited communication state 304, the mobile station allows only limited communication capabilities for the end user. The transmitter is normally powered off while the receiver is kept operational (albeit powered down intermittently in sleep modes to conserve power as is conventional). Alternatively, the transmitter and receiver are both powered off. In limited communication state 304, the mobile station does not permit any non-emergency communications such as non-emergency voice calls, non-emergency data service (e.g. communicating any normal e-mail message, Internet browsing, etc.), and over-the-air service provisioning.

In limited communication state 304, however, the mobile station does permit the placement of emergency two-way voice calls (e.g. 911 voice call) and permits any emergency data packet communication (e.g. emergency message or Internet data communication). If an emergency communication request is received at the user interface, the transmitter (and receiver where applicable) is powered on and the maximum transmit power is limited to a lower power level to reduce the likelihood of unacceptable spurious emissions. Also, the coding and modulation methods of the wireless transceiver may be limited for the same reasons. Preferably, after a mobile-initiated emergency communication, the mobile station invokes an emergency callback period during which mobile station enables and allows network-initiated position location services as well as incoming voice calls. Typically, a mobile station enters an emergency callback period lasting for five (5) minutes after an emergency call is terminated. This allows a Public Safety Answer Point (PSAP) the ability to call back and/or locate the user with use of technology such as Assisted Global Positioning System (A-GPS). Preferably, a visual indication of this communication state is provided in the visual display of the mobile station (e.g. "LIMITED" or "EMERGENCY ONLY").

Under more adverse temperature conditions, the mobile station identifies the operating temperature T to be within one of the very poor operating temperature ranges, where T1≦T<T2 or T5<T≦T6. T1 may be about −25° C. and T6 may be about 100° C., for example. If the operating temperature T is at such a level, spurious signals may be undesirably emitted by the transmitter at unacceptable levels when transmitting at the allowed maximum transmit power level in normal operating circumstances. Also, the battery may experience permanent damage and require replacement. Furthermore, the receiver performance may be degraded. Thus, if T1≦T<T2 or T5<T≦T6, the mobile station controls itself to operate in emergency-only text communication state 306. In emergency-only text communication state 306, the transmitter and the receiver are kept powered down (i.e. completely powered off, not merely in a sleep mode of operation). The mobile station does not permit any services including non-emergency or emergency (e.g. 911) two-way voice calls, or non-emergency data packet transmissions for end-user communication (e.g. ordinary e-mail message and Internet data communications), and over-the-air service provisioning. The mobile station also does not permit the reception of ordinary data packet communications (e.g. ordinary e-mail messages). In emergency-only text communication state 306, the mobile station only permits a mobile-initiated communication of text-based emergency messages. Preferably, a visual indication of this communication state may be provided in the visual display of the mobile station (e.g. "EMERGENCY ONLY TEXT"), assuming that the visual display can operate under such conditions.

These emergency text messages may be in the form of a short message service (SMS) message and/or an e-mail message, for example, which are communicated to some form of a Public-Safety Answering Point (PSAP) supporting messages. Preferably, the text-based emergency message is a predefined, prestored emergency text message in the mobile station (e.g. "EMERGENCY—PLEASE HELP"). In general, the sending of the emergency text message is the only time that the transceiver is powered on in state 306. The maximum transmit power is preferably limited at an even lower level to reduce the likelihood that no unacceptable spurious emissions exist. Also preferably, the emergency message is transmitted at a low data rate which requests a lower transmit power to achieve a given reliability of communication. Further, the coding and modulation methods of the wireless transceiver may be limited if necessary. The information may be sent over a control channel (e.g. an access channel) which eliminates the need of setting up a traffic channel. For example, the emergency text message may be in the form of an emergency SMS message transmitted over an access channel. The emergency message may or may not be accompanied by user-identifying information and/or location information (e.g. pilot phase information). Preferably, such information is included in the emergency message. An audible indication may be provided at the user interface to confirm that the emergency text message has been successfully transmitted and/or received (especially important where the visual display of the mobile station may not be operable under such conditions).

Under even more adverse operating conditions, the mobile station identifies the operating temperature T to be below temperature T1 or above temperature T6. If the operating temperature T is at such a level, spurious signals may be undesirably emitted by the transmitter at unacceptable levels or the battery may experience permanent damage and require replacement or could even explode. In this case, the mobile station controls itself to power down to the off state 308. In off state 308, the mobile station is completely shut down and no communication capabilities are provided for the end user. Not even emergency communications can be provided by the mobile station in off state 308.

Thus, when a communication request for communicating information is received through a user interface (e.g. keypad, keyboard, or touch screen display) of the mobile station, the mobile station will inhibit or allow the communication request depending on which communication state it is operating in. In the limited communication state, for example, the mobile station will inhibit a non-emergency communication but allow an emergency communication.

FIG. 4 is a flowchart which describes a method of limiting communication capabilities in a mobile communication device such as the mobile station described in relation to FIGS. 1 and 2. The communication states and temperatures/temperature ranges correspond to those described in relation to state diagram 300 of FIG. 3. A computer program product may include computer instructions stored on a computer storage medium (memory of the mobile station, a floppy disk or CD-ROM) which are written in accordance with the described logic.

Beginning at a start block 402 of FIG. 4, the mobile station detects whether its operating temperature T is within temperature range T3-T4 (step 404). If so, the mobile station operates in its full communication state (step 406). If the operating temperature T is not within temperature range T3-T4, the mobile station detects whether the operating temperature T is within temperature range T2-T3 or T4-T5 (step 408). If so, the mobile station operates in its limited communication state (step 410). If the operating temperature T is not within temperature range T2-T3 or T4-T5, the mobile station detects whether its operating temperature T is within temperature range T1-T2 or T5-T6 (step 412). If so, the mobile station operates in its emergency-only communication state (step 414). If the operating temperature T is not within T1-T2 or T5-T6, the mobile station detects whether its operating temperature T is less than T1 or greater than T6 (step 416). If so, the mobile station powers itself down completely (step 418). The mobile station will remain powered down from step 418 until the end user powers it back up and the adverse condition is gone. Upon power up, the mobile station starts again at start block 402 and may operate to follow the previous decision to obtain the device state. For example, if the mobile station is determined to be in OFF state again, the mobile station powers itself off after an audible or visual indication to the user; if the adverse condition is gone, however, the mobile station will remain in a different state corresponding to current conditions.

Although FIGS. 3 and 4 are primarily directed to limiting communication capabilities based on temperature, the techniques apply to limiting communication capabilities based on low battery voltage in the same way (or limiting communication capabilities based on the combined use of temperature(s) and low battery voltage).

Final Comments. Methods and apparatus for limiting communication capabilities in mobile communication devices have been described. In one illustrative example, a predetermined condition such as an unsatisfactory temperature or a low battery voltage is detected at the mobile communication device. At this time, a communication request for communicating information through a wireless communication network is received through a user interface. If the communication request is for a non-emergency communication, the non-emergency communication is inhibited during the existence of the predetermined condition. If the communication request is for an emergency communication, however, the emergency communication is allowed despite the existence of the predetermined condition. The emergency communication may be a "911" voice call or an emergency message. The maximum allowed transmit power may be limited to a certain level to reduce the likelihood that unacceptable spurious emissions exist. The coding and modulation methods may also be limited to a subset of that which the mobile station would otherwise support.

The above-described embodiments of the present application are intended to be examples only. Those of skill in the art may effect alterations, modifications and variations to the particular embodiments without departing from the scope of the application. For example, instead of using temperature-based conditions, low battery conditions or automatic location-based power down conditions (e.g. automatic airplane power down) may be utilized. The invention described herein in the recited claims intends to cover and embrace all suitable changes in technology.

What is claimed is:

1. A method for use in a mobile device, the method comprising:
   detecting a temperature condition at said device;
   in response, operating in a limited communication state for which only emergency communication is permitted; and
   operating in a full communication state if said temperature condition fails to exist;
   wherein operating in said full communication state comprises allowing user-initiated communication requests for emergency and non-emergency communications from said mobile device.

2. The method of claim 1 wherein an indication of said limited communication state is provided on a visual display.

3. The method of claim 1, further comprising:
   receiving a user-initiated communication request for an emergency communication; and
   permitting said emergency communication despite the existence of said temperature condition.

4. The method of claim 1, wherein said emergency communication comprises an emergency telephone call.

5. The method of claim 1, wherein said emergency communication comprises an emergency data message.

6. The method of claim 1, wherein said emergency communication comprises at least one of a communication with a public safety access point and a communication initiated by entry of an emergency telephone number.

7. The method of claim 1, wherein detecting that said temperature condition exists further comprises:
   monitoring a temperature based on signals read from a temperature sensor; and
   detecting that said temperature condition exists based on said monitored temperature.

8. The method of claim 1, wherein detecting that said temperature condition exists further comprises:
   monitoring a temperature from signals read from a temperature sensor; and
   detecting that said temperature condition exists if said monitored temperature is greater than a threshold.

9. The method of claim 1, wherein detecting whether said temperature condition exists comprises detecting whether a temperature condition exists in a battery of said mobile device.

10. The method of claim 1, wherein detecting whether said temperature condition exists comprises detecting whether a temperature condition exists at a power amplifier of said mobile device.

11. A mobile device configured to provide communications in a wireless communication network, said mobile device comprising:
    a temperature sensor;
    a radio frequency (RF) transceiver configured for wireless communications via said wireless communication network;
    a processor coupled to said temperature sensor and said RF transceiver, said processor being configured to:
        detect a temperature condition at said device based on signals read from said temperature sensor;
        in response, operate in a limited communication state for which only emergency communication is permitted; and
        operate in a full communication state if said temperature condition fails to exist;
        wherein operating in said full communication state comprises allowing user-initiated communication requests for emergency and non-emergency communications from said mobile device.

12. The mobile device of claim 11, further comprising a visual display;
    wherein said processor is further configured to provide an indication of said limited communication state on said visual display.

13. The mobile device of claim 11, further comprising:
    a battery interface configured to receive a battery that provides electrical power to said RF transceiver and said processor,
    wherein detecting whether said temperature condition exists comprises detecting whether a temperature condition exists at said battery.

14. The mobile device of claim 13, further comprising:
    said battery,
    wherein said temperature sensor is in said battery.

15. The mobile device of claim 11, wherein said temperature sensor comprises a thermistor.

16. The mobile device of claim 11, wherein said mobile device comprises a cellular telephone.

17. The mobile device of claim 11, further comprising a user interface, said user interface configured to receive a user-initiated communication request.

18. The mobile device of claim 17, wherein said user interface comprises one of a keypad, a keyboard, and a touch screen display.

19. The mobile device of claim 11, wherein said emergency communication comprises at least one of an emergency telephone call and an emergency data message.

20. A method for use in a mobile device having a visual display, the method comprising:
    detecting whether a temperature condition exists at said mobile device; and
    when said temperature condition exists, providing a visual indication indicating that said mobile device is in a limited communication state;
    wherein said limited communication state comprises a state in which a user-initiated communication request for a non-emergency communication is not permitted and a user-initiated communication request for an emergency communication is permitted.

21. The method of claim 20, further comprising:
    in response to detecting that said temperature condition exists, operating said mobile device in said limited communication state.

22. The method of claim 20, wherein said visual indication comprises an "EMERGENCY ONLY" indication.

23. The method of claim 20, wherein said non-emergency communication comprises a non-emergency telephone call and said emergency communication comprises an emergency telephone call.

24. The method of claim 20, further comprising:
    when said temperature condition fails to exist, operating in a full communication state;

wherein said full communication state comprises a state in which user-initiated communication requests for emergency and non-emergency telephone calls are permitted.

25. A method for use in a mobile device, the method comprising:
   detecting a temperature condition at said device; and
   in response, operating in a limited communication state for which only emergency communication with a public safety answering point is permitted.

26. The method of claim 25, wherein said emergency communication comprises at least one of an emergency telephone call and an emergency data message.

27. The method of claim 25, wherein said device comprises a mobile telephone device operative for communications in a wireless communication network.

28. The method of claim 25, further comprising:
   operating in a full communication state if said temperature condition fails to exist;
   wherein operating in said full communication state comprises allowing user-initiated communication requests for emergency and non-emergency communications from said mobile device.

* * * * *